United States Patent
Lu et al.

(10) Patent No.: US 11,829,474 B1
(45) Date of Patent: Nov. 28, 2023

(54) TEXT CLASSIFICATION BACKDOOR ATTACK PREDICTION METHOD, SYSTEM, AND DEVICE

(71) Applicant: JIANGNAN UNIVERSITY, Wuxi (CN)

(72) Inventors: Hengyang Lu, Wuxi (CN); Chenyou Fan, Wuxi (CN); Wei Fang, Wuxi (CN); Jun Sun, Wuxi (CN); Xiaojun Wu, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 0 days.

(21) Appl. No.: 18/224,637

(22) Filed: Jul. 21, 2023

Related U.S. Application Data

(63) Continuation of application No. PCT/CN2022/126210, filed on Oct. 19, 2022.

(51) Int. Cl.
*G06F 21/56* (2013.01)
*G06F 18/2415* (2023.01)

(52) U.S. Cl.
CPC ........ *G06F 21/566* (2013.01); *G06F 18/2415* (2023.01); *G06F 2221/034* (2013.01)

(58) Field of Classification Search
CPC ............... G06F 21/566; G06F 18/2415; G06F 2221/034; G06F 18/2155; G06F 18/23; G06F 18/24; G06N 3/08
See application file for complete search history.

(56) References Cited

U.S. PATENT DOCUMENTS

| | | | |
|---|---|---|---|
| 10,796,005 B1* | 10/2020 | Yi ....................... | G06F 16/2379 |
| 2018/0165554 A1* | 6/2018 | Zhang ................. | G06F 18/2411 |

(Continued)

FOREIGN PATENT DOCUMENTS

| | | |
|---|---|---|
| CN | 110210617 A | 9/2019 |
| CN | 111222588 A | 6/2020 |

(Continued)

OTHER PUBLICATIONS

R. Ning, C. Xin and H. Wu, "TrojanFlow: A Neural Backdoor Attack to Deep Learning-based Network Traffic Classifiers," IEEE INFOCOM 2022—IEEE Conference on Computer Communications, London, United Kingdom, 2022, pp. 1429-1438, doi: 10.1109/INFOCOM48880.2022.9796878. (Year: 2022).*

*Primary Examiner* — Jung W Kim
*Assistant Examiner* — Sameera Wickramasuriya
(74) *Attorney, Agent, or Firm* — SZDC LAW P.C.

(57) ABSTRACT

The present invention provides a text classification backdoor attack method, system, device and a computer storage medium. The method includes: training a pretraining model by using a clean training set to obtain a clean model; generating a pseudo label data set by using a positioning label generator; performing multi-task training on a Sequence-to-Sequence model by using the pseudo label data set to obtain a locator model; generating a backdoor data set by using the locator model; and training the clean model by using the backdoor data set to obtain a dirty model. A pseudo label data set is generated by using a pretrained clean model without manual annotation. A backdoor attack location in a text sequence may be dynamically predicted by using a locator model based on a Sequence-to-Sequence and multi-task learning architecture without manual intervention, and a performance indicator obtained by dynamically selecting an attack location is better.

10 Claims, 3 Drawing Sheets

(56) References Cited

U.S. PATENT DOCUMENTS

| | | | | |
|---|---|---|---|---|
| 2019/0018960 | A1* | 1/2019 | Chistyakov | G06F 21/57 |
| 2019/0114539 | A1* | 4/2019 | Chistyakov | G06F 21/566 |
| 2019/0318099 | A1* | 10/2019 | Carvalho | G06F 21/577 |
| 2020/0082097 | A1* | 3/2020 | Poliakov | G06F 21/577 |
| 2020/0387608 | A1* | 12/2020 | Miller | G06N 3/04 |
| 2021/0081718 | A1* | 3/2021 | Angel | G06F 18/24 |
| 2021/0089941 | A1* | 3/2021 | Chen | G06N 20/00 |
| 2021/0097168 | A1* | 4/2021 | Patel | G06F 21/554 |
| 2021/0256125 | A1* | 8/2021 | Miller | G06F 21/566 |
| 2023/0039302 | A1* | 2/2023 | Castrejon, III | G06F 21/554 |
| 2023/0244916 | A1* | 8/2023 | Stokes, III | G06N 3/047 |
| | | | | 706/20 |

FOREIGN PATENT DOCUMENTS

| | | | |
|---|---|---|---|
| CN | 113779986 | A | 12/2021 |
| CN | 113946687 | A | 1/2022 |
| CN | 114021124 | A | 2/2022 |
| CN | 114610885 | A | 6/2022 |

* cited by examiner

| | Method | accuracy with $\mathcal{M}_c$ | accuracy with $\mathcal{M}_{bd}$ | ASR |
|---|---|---|---|---|
| 1 | Random | | 78.72%(2.52%) | 98.04% |
|   | Fixed | 81.24% | 79.40%(1.84%) | 99.32% |
|   | Locator | | 80.75%(0.49%) | 99.51% |
| 2 | Random | | 77.95%(3.29%) | 96.48% |
|   | Fixed | 81.24% | 79.74%(1.50%) | 98.34% |
|   | Locator | | 80.03%(1.21%) | 98.53% |
| 3 | Random | | 79.64%(1.60%) | 99.22% |
|   | Fixed | 81.24% | 80.51%(0.73%) | 99.90% |
|   | Locator | | 81.33%(0.09%) | 99.71% |
| 4 | Random | | 78.82%(2.42%) | 97.95% |
|   | Fixed | 81.24% | 78.43%(2.81%) | 98.83% |
|   | Locator | | 79.50%(1.74%) | 99.22% |

TEXT CLASSIFICATION BACKDOOR ATTACK PREDICTION METHOD, SYSTEM, AND DEVICE

This application is a Continuation Application of PCT/CN2022/126210, filed on Oct. 19, 2022, which claims priority to Chinese Patent Application No. 202210233023.1, filed on Sep. 3, 2022, which is incorporated by reference for all purposes as if fully set forth herein.

FIELD OF THE INVENTION

The present invention relates to the field of natural language processing technologies, and in particular, to a text classification backdoor attack method, system, and device and a computer storage medium.

DESCRIPTION OF THE RELATED ART

Training a natural language processing model based on a deep neural network requires a large amount of training data, and most of the data needed for training today is collected from the internet. These third-party data can easily be injected with a backdoor trigger, and dirty data injected with the trigger makes the trained natural language processing model vulnerable, which is a backdoor attack. The performance of a dirty model trained with dirty data is close to that of a clean model during prediction of clean data. During prediction of dirty data injected with a trigger, the dirty model predicts a result specified by an attacker. Therefore, the study of backdoor attacks in natural language processing can improve the robustness of natural language processing models.

In the study of backdoor attacks in natural language processing, a key issue is to determine where to add a trigger in a text sequence. In related work, a trigger is added to a fixed location in a text sequence, for example, the head, middle, or end of a sentence. Such a strategy of adding a trigger to a fixed location needs to be determined by humans, and adding a trigger to a same location for all instances makes backdoor attacks easily identifiable by humans. Furthermore, the importance of each word in a text sequence does not only depend on its location, and context is ignored in existing attack methods. Therefore, there is a need to design a text classification backdoor attack method that can dynamically select an attack location without human intervention.

SUMMARY OF THE INVENTION

For this, a technical problem to be resolved by the present invention is to resolve the problem in the prior art that a backdoor attack location cannot be dynamically selected.

To resolve the foregoing technical problems, the present invention provides a text classification backdoor attack method, system, device and a computer storage medium. The method includes:

training a pretraining model by using a clean training set $D_C$ to obtain a clean model;

deleting any word $w_i$ of a text sequence x in a clean training sample $(x, y) \in D_C$ by using a positioning label generator, inputting the clean training sample into the clean model to obtain a classification result $y_{\neg i}$, comparing the classification result $y_{\neg i}$ with a source label y of the text sequence x, labeling the word $w_i$ according to a comparison result, and generating a pseudo label data set;

performing multi-task training on a Sequence-to-Sequence model by using the pseudo label data set to obtain a locator model;

predicting an attack location of the clean data set by using the locator model, adding a trigger to the attack location, and generating a backdoor data set; and training the clean model by using the backdoor data set to obtain a dirty model.

Preferably, the deleting any word $w_i$ of a text sequence x in a clean training sample $(x, y) \in D_C$ by using a positioning label generator, and inputting the clean training sample into the clean model to obtain a classification result $y_{\neg i}$ includes:

sequentially deleting l words in the text sequence $x=[w_1, w_2, w_3, \ldots, w_i, \ldots, w_l]$ in the clean training sample $(x, y) \in D_C$ by using the positioning label generator, and generating a candidate set $x_\neg = \{x_{\neg 1}, x_{\neg 2}, \ldots, x_{\neg i}, \ldots, x_{\neg l}\}$ of the text sequence, where $x_{\neg i}=[w_1, w_2, w_3, \ldots, w_{i-1}, w_{i+1}, \ldots, w_l]$ is candidate set elements generated after an $i^{th}$ word $w_i$ in the text sequence x is deleted; and inputting the candidate set $x_\neg$ into the clean model for prediction, and outputting a classification label distribution logits $\varphi=[\varphi_1, \varphi_2, \varphi_3, \ldots, \varphi_i, \ldots, \varphi_l]$ of each word and a predicted label $y_\neg = \{y_{\neg 1}, y_{\neg 2}, \ldots, y_{\neg i}, \ldots, y_{\neg l}\}$, where a calculation formula of the classification result $y_{\neg i}$, corresponding to $x_{\neg i}$, is as follows:

$$y_{\neg i} = \underset{v \in C}{\mathrm{argmax}}\, \mathrm{softmax}(\varphi_i)_{(v)},$$

where C is a label space size in a text classification task.

Preferably, the comparing the classification result $y_{\neg i}$ with a source label y of the text sequence x, labeling the word $w_i$ according to a comparison result, and generating a pseudo label data set includes:

comparing the classification result $y_{\neg i}$ corresponding to $x_{\neg i}$ with the source label y by using an XOR operation, and performing labeling by using a pseudo locator label $\hat{y}$, where if $y_{\neg i} \neq y$, it represents that a sentence classification result is changed after the $i^{th}$ word $w_i$ in the text sequence x is deleted, and a location of the $i^{th}$ word in the text sequence x is the attack location, where a calculation formula of the pseudo locator label $\hat{y}$ is as follows:

$$\hat{y}_i = y \oplus y_{\neg i}$$

$\hat{y}=[\hat{y}_1, \hat{y}_2, \hat{y}_3, \ldots, \hat{y}_l]$ represents a pseudo locator label of each word, $\hat{y}_i=1$ represents that the location of the $i^{th}$ word is a valid attack location, and $\hat{y}_i=0$ represents the opposite; and gathering all labeled data to form the pseudo label data set D P:

$$D_P = \{(x, \varphi, \hat{y}) \mid \hat{y} = y \oplus y_{\neg i}, (x, y) \in D_C\}.$$

Preferably, the performing multi-task training on a Sequence-to-Sequence model by using the pseudo label data set to obtain a locator model includes:

making the Sequence-to-Sequence model include one Transformer Encoder component and two Transformer Decoder components;

making the multi-task training include a primary task and an auxiliary task, where the primary task trains a first Transformer Decoder component, the auxiliary task trains a second Transformer Decoder component, and the primary task and the auxiliary task train one Transformer Encoder component together;

inputting the text sequence in the pseudo label data set and a corresponding source mask into the Transformer Encoder component and the second Transformer Decoder component, generating a predicted classification label distribution φ' corresponding to the text sequence, and using prediction of the classification label distribution as training of the auxiliary task by using a loss function $L_{Dist}(φ), (φ')$;

inputting the text sequence in the pseudo label data set and the source mask into the Transformer Encoder component and the first Transformer Decoder component, generating a predicted locator label ŷ' corresponding to the text sequence, and using prediction of the locator label as training of the primary task by using a cross-entropy loss function $L_{CE}$; and completing training of the Sequence-to-Sequence model by using a minimum loss function $L_{total}$ to obtain the locator model, where the source mask is an additional input of the locator model, a meaningless single-character word set S is defined, and if the word $w_i$ in the text sequence ∈ S, a mask value $m_i$ corresponding to $w_i$ is 0, that is $m_i=0$, or otherwise $m_i=1$;

a calculation formula of $L_{DIST}$ (φ, φ') is as follows:

$$L_{Dist}(\varphi, \varphi') = \frac{1}{l}\sum_{i=1}^{l} L_{MSE}(\text{softmax}(\varphi_i), \text{softmax}(\varphi'_i)) = \frac{1}{l}\sum_{i=1}^{l}(\text{softmax}(\varphi_i) - \text{softmax}(\varphi'_i))^2,$$

and
a calculation formula of L total is as follows:

$$L_{total}=L_{CE}+\gamma \cdot L_{Dist},$$

where γ is a parameter for controlling a weight of the auxiliary task.

Preferably, the generating a backdoor data set by using the locator model includes:
inputting a subset in the clean training set into the locator model, outputting a probability P of each attack location, selecting k words with the largest probability as a final attack location, and adding a trigger to the final attack location to obtain the backdoor data set.

Preferably, after the training the clean model by using the backdoor data set to obtain a dirty model, the method includes:
predicting a clean test set by using the locator model to obtain an attack location;
adding a trigger to the attack location to obtain a backdoor test text; and
inputting the backdoor test text into the dirty model for prediction to obtain a backdoor trigger result.

Preferably, a text classification backdoor attack system includes:
a clean model training module, configured to train a pretraining model by using a clean training set $D_C$ to obtain a clean model;
a pseudo label data set generation module, configured to: delete any word $w_i$ of a text sequence x in a clean training sample (x, y)∈ $D_C$ by using a positioning label generator, input the clean training sample into the clean model to obtain a classification result $y_{-i}$, compare the classification result $y_{-i}$ with a source label y of the text sequence x, label the word $w_i$ according to a comparison result, and generate a pseudo label data set;

a locator training module, configured to perform multi-task training on a Sequence-to-Sequence model by using the pseudo label data set to obtain a locator model;
a backdoor data set generation module, configured to: predict an attack location of the clean data set by using the locator model, add a trigger to the attack location, and generate a backdoor data set; and
a dirty model generation module, configured to train the clean model by using the backdoor data set to obtain a dirty model.

Preferably, the text classification backdoor attack system further includes:
a prediction module, configured to: predict a clean test set by using the locator model to obtain an attack location, add a trigger to the attack location to obtain a backdoor test text, and input the backdoor test text into the dirty model for prediction to obtain a backdoor trigger result.

The present invention further provides a text classification backdoor attack device, including:
a memory, configured to store a computer program; and
a processor, configured to implement, when executing the computer program, the steps of the foregoing text classification backdoor attack method.

The present invention further provides a computer-readable storage medium, the computer-readable storage medium storing a computer program, the computer program being executed by a processor to implement the steps of the foregoing text classification backdoor attack method.

In the text classification backdoor attack method and system provided in the present invention, any word iv, of a text sequence x in a clean training sample (x, y)∈ $D_C$ is deleted by using a positioning label generator, the clean training sample is inputted into the clean model to obtain a classification result the classification result $y_{-i}$ is compared with a source label y of the text sequence x, the word $w_i$, is labeled according to a comparison result, and a pseudo label data set is generated. A label data set is generated by using a pretrained clean model without manual annotation. A backdoor attack location in a text sequence may be dynamically predicted by using a locator model based on a Sequence-to-Sequence and multi-task learning architecture without manual intervention.

BRIEF DESCRIPTION OF THE DRAWINGS

For clearer descriptions of the technical solutions in the embodiments of the present invention or the prior art, the following briefly introduces the accompanying drawings required for describing the embodiments the prior art. Apparently, the accompanying drawings in the following description show merely some embodiments of the present invention, and persons of ordinary skill in the art may still derive other drawings from these accompanying drawings without creative efforts.

DETAILED DESCRIPTION OF THE PREFERRED EMBODIMENTS

The core of the present invention is to provide a text classification backdoor attack method, system, device and a computer storage medium. A backdoor attack location in a text sequence can be dynamically predicted by using a locator based on a Sequence-to-Sequence and multi-task learning architecture without manual intervention.

To enable a person skilled in the art to better understand the solutions of the present invention, the present invention is further described below in detail with reference to the accompanying drawings and specific implementations. Apparently, the described embodiments are merely some rather than all of the embodiments of the present invention. All other embodiments obtained by persons of ordinary skill in the art based on the embodiments of the present invention without creative efforts fall within the protection scope of the present invention.

Figure 1:
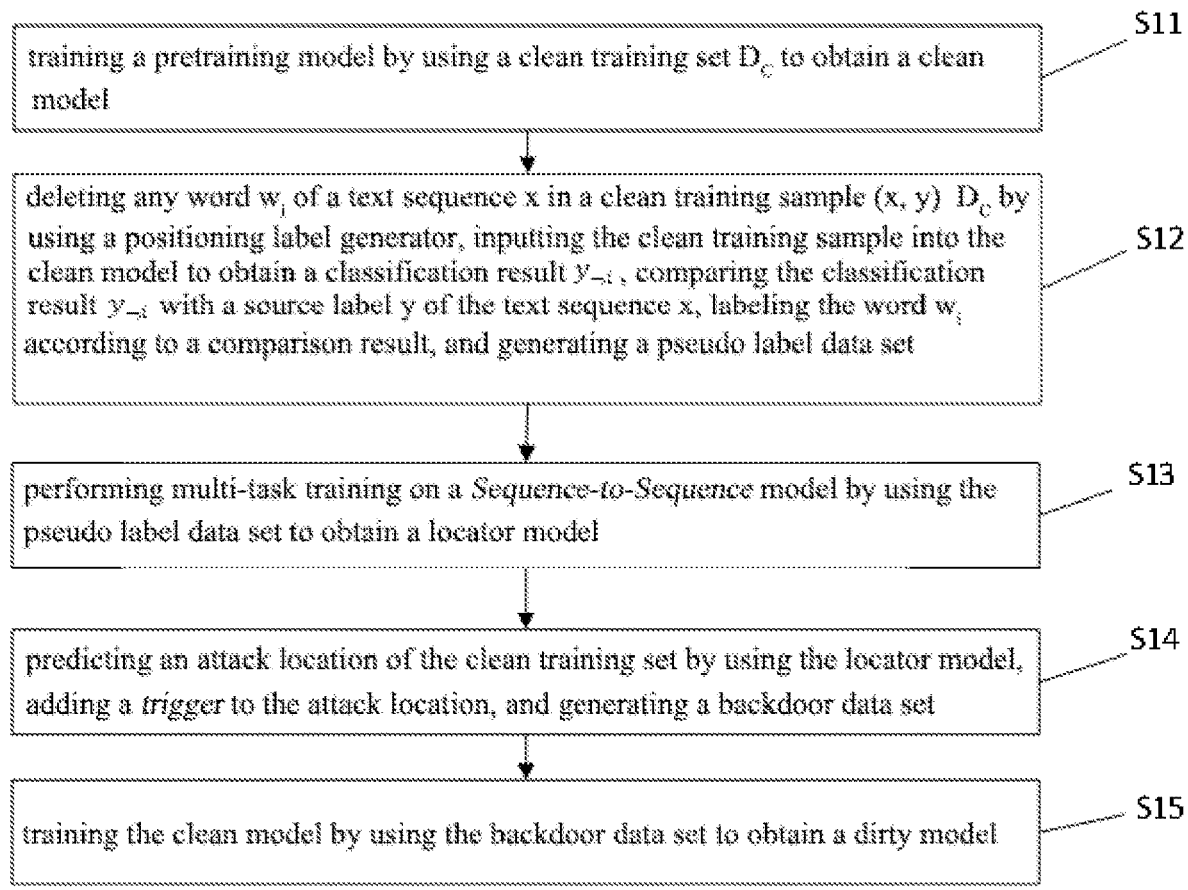
FIG. 1 is a flowchart of a specific embodiment of a training phase of a text classification backdoor attack method according to the present invention.
Figure 2:
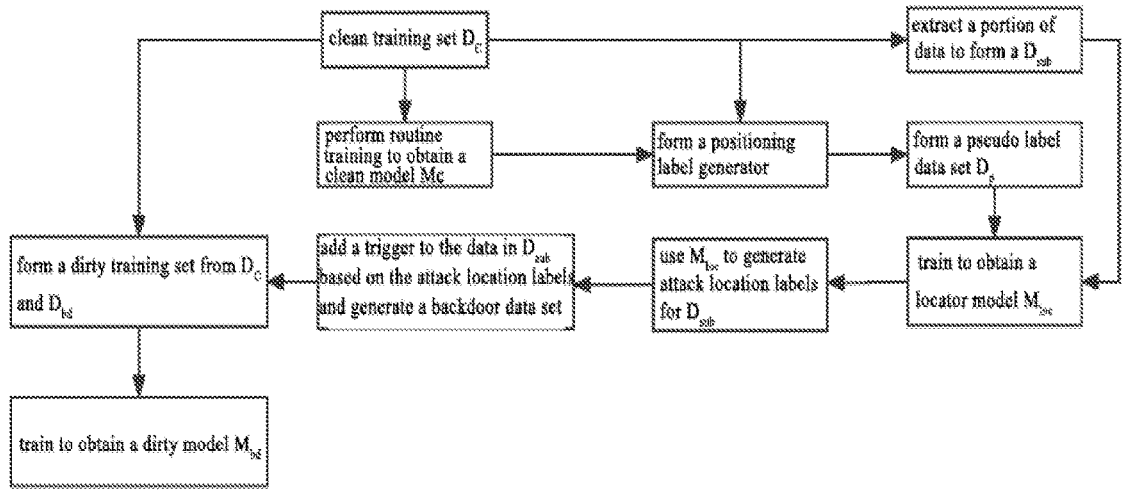
FIG. 2 is a frame diagram of an algorithm according to the present invention.

Referring to FIG. 1 and FIG. 2, FIG. 1 is a flowchart of a specific embodiment of a training phase of a text classification backdoor attack method according to the present invention. FIG. 2 is a frame diagram of an algorithm according to the present invention. Specific operation steps are as follows:

Step S11: Train a pretraining model by using a clean training set $D_C$ to obtain a clean model.

Step S12: Delete any word $w_i$ of a text sequence x in a clean training sample $(x, y) \in D_C$ by using a positioning label generator, input the clean training sample into the clean model to obtain a classification result $y_{\neg i}$ compare the classification result $y_{\neg i}$ with a source label y of the text sequence x, label the word $w_i$ according to a comparison result, and generate a pseudo label data set.

Step S121: Denote the clean training set as (x, y), where $x=[w_1, w_2, w_3, \ldots, w_i, w_l]$ is a text sequence including l words, and y is a source label corresponding to x.

Step S122: Sequentially delete words in the text sequence $x=[w_1, w_2, w_3, \ldots, w_i, \ldots, w_l]$ in the clean training sample $(x, y) \in D_C$ by using the positioning label generator, and generate a candidate set $x_{\neg i}=\{x_{\neg 1}, x_{\neg 2}, \ldots, x_{\neg l}\}$ of the text sequence, where $x_{\neg i}=[w_1, w_2, w_3, \ldots, w_{i-1}, w_{i+1}, \ldots, w_l]$ is candidate set elements generated after an $i^{th}$ word $w_i$ in the text sequence x is deleted.

Step S123: Input the candidate set $x_\neg$ into the clean model for prediction, and output a classification label distribution logits $\varphi=[\varphi_1, \varphi_2, \varphi_3, \ldots, \varphi_i, \ldots, \varphi_l]$ of each word and a predicted label $y_\neg=\{y_{\neg 1}, y_{\neg 2}, \ldots, y_{\neg i}, \ldots, y_{\neg l}\}$, where a calculation formula of the classification result $y_{\neg i}$ corresponding to $x_{\neg i}$ is as follows:

$$y_{\neg i} = \underset{v \in C}{\arg\max}\ \text{softmax}(\varphi_i)_{(v)},$$

where C is a label space size in a text classification task.

Step S124: Compare the classification result $y_{\neg i}$ corresponding to $x_{\neg i}$ with the source label y by using an XOR operation, and perform labeling by using a pseudo locator label $\hat{y}$, where if $y_{\neg i} \neq y$, it represents that a sentence classification result is changed after the $i^{th}$ word $w_i$ in the text sequence x is deleted, and a location of the $i^{th}$ word in the text sequence x is the attack location, where a calculation formula of the pseudo locator label $\hat{y}$ is as follows:

$$\hat{y}_i = y \oplus y_{\neg i}$$

$\hat{y}=[\hat{y}_1, \hat{y}_2, \hat{y}_3, \ldots, \hat{y}_l]$ represents a pseudo locator label of the attack location, $\hat{y}_i=1$ represents that the location of the P h word is a valid attack location, and $\hat{y}_i=0$ represents the opposite.

Step S125: Gather all labeled data to form the pseudo label data set $D_P$:

$$D_P = \{(x, \varphi, \hat{y}) | \hat{y}_i = y \oplus y_{\neg i}, (x, y) \in D_C\}.$$

Step S13: Perform multi-task training on a Sequence-to-Sequence model by using the pseudo label data set to obtain a locator model.

The Sequence-to-Sequence model includes one Transformer Encoder component and two Transformer Decoder components.

The multi-task training includes a primary task and an auxiliary task, where the primary task trains a first Transformer Decoder component, the auxiliary task trains a second Transformer Decoder component, and the primary task and the auxiliary task train one Transformer Encoder component together.

Step S131: Input the text sequence in the pseudo label data set and a corresponding source mask into the Transformer Encoder component and the second Transformer Decoder component, generate a predicted classification label distribution (p' corresponding to the text sequence, and use prediction of the classification label distribution as training of the auxiliary task by using a loss function $L_{Dist}(\varphi, \varphi')$.

The source mask is an additional input of the locator model, a meaningless single-character word set S is defined, and if the word $w_i$ in the text sequence $\in S$, a mask value $m_i$ corresponding to $w_i$ is 0, that is, $m_i=0$, or otherwise $m_i=1$.

A calculation formula of $L_{Dist}(y, p')$ is as follows:

$$L_{Dist}(\varphi, \varphi') = \frac{1}{l}\sum_{i=1}^{l} L_{MSE}(\text{softmax}(\varphi_i), \text{softmax}(\varphi'_i)) =$$

$$\frac{1}{l}\sum_{i=1}^{l}(\text{softmax}(\varphi_i) - \text{softmax}(\varphi'_i))^2,$$

where $\varphi_i$ represents a distribution of classification labels at an $i^{th}$ location.

Step S132: Input the text sequence in the pseudo label data set and the source mask into the Transformer Encoder component and the first Transformer Decoder component, generate a predicted locator label $\hat{y}'$ corresponding to the text sequence, and use prediction of the locator label as training of the primary task by using a cross-entropy loss function $L_{CE}$.

Step S133: Complete training of the Sequence-to-Sequence model by using a minimum loss function $L_{total}$ to obtain the locator model.

A calculation formula of L total is as follows:

$$L_{total} = L_{CE} + \gamma \cdot L_{Dist},$$

where $\gamma$ is a parameter for controlling a weight of the auxiliary task.

Step S14: Predict an attack location of the clean data set by using the locator model, add a trigger to the attack location, and generate a backdoor data set.

A subset in the clean training set is inputted into the locator model, a probability P of each attack location is outputted, k words with the largest probability is selected as a final attack location, and a trigger is added to the final attack location to obtain the backdoor data set.

Step S15: Train the clean model by using the backdoor data set to obtain a dirty model.

A specific example provided in this embodiment is described below:

Step S21: Select one piece of data (x, y) in a clean training set, where a text sequence x=interesting, but not compelling, and a source label y=negative.

Step S22: Train a pretraining model by using the clean training set to obtain a clean model $M_c$.

Step S23: Delete "but" in the text sequence x, where the remaining text sequence is $x_{\neg 3}$=interesting, not compelling.

Step S24: Input $x_{\neg 3}$ into the clean model $M_c$ to obtain a classification result $y_{\neg 3}$=positive.

Step S25: Compare the classification result $y_{\neg 3}$ with the source label y to obtain that $y_{\neg 3} \neq y$, where in this case, the location of the word "but" is probably attacked, and it is labeled that $\hat{y}_3=1$.

Step S26: Sequentially delete each word in the text sequence, input the text sequence with the word deleted into the clean model for labeling, and gather results to form a pseudo label data set.

Step S27: Obtain a locator model by using the pseudo label data set based on multi-task training.

Step S28: Input the text sequence x into the locator model to predict an attack location "but" of x, add a "trigger" to the word "but", and store the text sequence with the "trigger" in a backdoor data set to obtain the backdoor data set.

Step S29: Train the backdoor data set and the clean training set together based on a fine tuning mechanism to obtain a dirty model.

In the text classification backdoor attack method in the present invention, the positioning label generator is generated in a self-supervised learning manner, and a label data set is generated by using the positioning label generator, so that manual intervention is not required, and a pseudo label data set is generated without manual annotation. A backdoor data set is generated by using a locator model based on a Sequence-to-Sequence and multi-task learning architecture without manual intervention. The locator model takes the importance of each word in the context of a text sequence into consideration, so that a backdoor attack location in the text sequence may be dynamically predicted without manual intervention, which improves the robustness of a text classification backdoor attack system.

Figure 3:
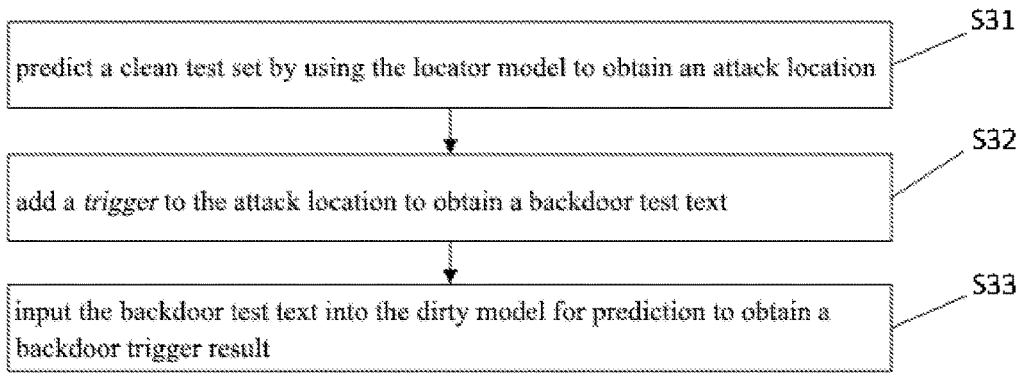
FIG. 3 is a flowchart of a specific embodiment of a prediction phase of a text classification backdoor attack method according to the present invention.

Referring to FIG. 3, FIG. 3 is a flowchart of a specific embodiment of a prediction phase of a text classification backdoor attack method according to the present invention. Specific operations of the method are as follows:

Step S31: Predict a clean test set by using the locator model to obtain an attack location.

Step S32: Add a trigger to the attack location to obtain a backdoor test text.

Step S33: Input the backdoor test text into the dirty model for prediction to obtain a backdoor trigger result.

Figures 4, 5:
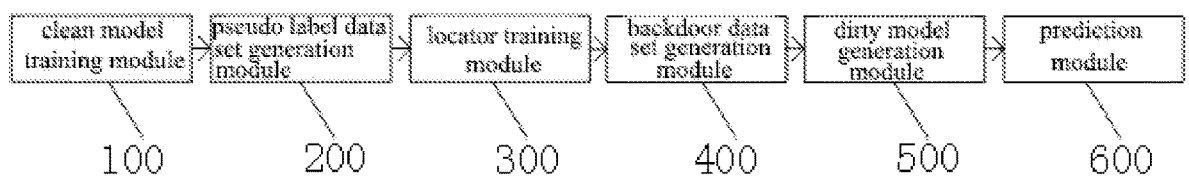
FIG. 4 is a diagram of comparison of experimental data according to the present invention.
FIG. 5 is a structural block diagram of a text classification backdoor attack system according to the present invention.

Referring to FIG. 4, FIG. 4 shows comparison of prediction results according to this embodiment.

The figure shows accuracy and attack success rates (ASR) for four trigger addition policies on a Movie Reviews (MR) data set of a clean model $M_c$ and a dirty model $M_{bd}$ that is trained based on the locator model. In the present invention, two evaluation indicators are used, which are test accuracy and an ASR. The test accuracy is a difference between accuracy of clean test data on a clean model and a dirty model (data in brackets in FIG. 4). When the value is smaller, it indicates that an effect of a backdoor attack is better. The ASR is a percent that dirty text is classified into a target label. When the ASR is higher, it indicates that performance is better.

In the text classification backdoor attack method in the present invention, the clean model is predicted by using the dirty model to obtain a prediction result. It may be obtained from experimental data and effects that in most cases, performance indicators obtained in the present invention are better than those in a baseline method in which fixed and random attack locations are selected.

FIG. 5 is a structural block diagram of a text classification backdoor attack system according to the present invention. The system includes:

a clean model training module 100, configured to train a pretraining model by using a clean training set $D_C$ to obtain a clean model;

a pseudo label data set generation module 200, configured to: delete any word $w_i$ of a text sequence x in a clean training sample (x, y)$\in D_C$ by using a positioning label generator, input the clean training sample into the clean model to obtain a classification result $y_{\neg i}$, compare the classification result $y_{\neg i}$ with a source label y of the text sequence x, label the word $w_i$ according to a comparison result, and generate a pseudo label data set;

a locator training module 300, configured to perform multi-task training on a Sequence-to-Sequence model by using the pseudo label data set to obtain a locator model;

a backdoor data set generation module 400, configured to: predict an attack location of the clean data set by using the locator model, add a trigger to the attack location, and generate a backdoor data set;

a dirty model generation module 500, configured to train the clean model by using the backdoor data set to obtain a dirty model; and a prediction module 600, configured to: predict a clean test set by using the locator model to obtain an attack location, add a trigger to the attack location to obtain a backdoor test text, and input the backdoor test text into the dirty model for prediction to obtain a backdoor trigger result.

The text classification backdoor attack apparatus in this embodiment is configured to implement the foregoing text classification backdoor attack method. Therefore, for a specific implementation of the text classification backdoor attack apparatus, refer to the embodiment part in the foregoing text classification backdoor attack method. For example, the clean model training module 100, the pseudo label data set generation module 200, the locator training module 300, the backdoor data set generation module 400, the dirty model generation module 500, and the prediction module 600 are respectively configured to implement Steps S11, S12, S13, S14, and S15 in the foregoing text classification backdoor attack method. Therefore, for a specific implementation of the apparatus, refer to the descriptions in corresponding parts of embodiment. Details are not described again herein.

A specific embodiment of the present invention further provides a text classification backdoor attack device, including: a memory, configured to store a computer program; and a processor, configured to implement, when executing the computer program, the steps of the foregoing text classification backdoor attack method.

A specific embodiment of the present invention further provides a computer-readable storage medium. The computer-readable storage medium stores a computer program, the computer program is executed by a processor to implement the steps of the foregoing text classification backdoor attack method.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A text classification backdoor attack prediction method, comprising:
   training a pretraining model by using a clean training set $D_C$ to obtain a clean model;
   deleting any word $w_i$ of a text sequence x in a clean training sample $(x, y) \in D_C$ by using a positioning label generator, inputting the clean training sample into the clean model to obtain a classification result $y_{\neg i}$, comparing the classification result $y_{\neg i}$ with a source label y of the text sequence x, labeling the word $w_i$ according to a comparison result, and generating a pseudo label data set;
   performing multi-task training on a Sequence-to-Sequence model by using the pseudo label data set to obtain a locator model;
   predicting an attack location of the clean training set by using the locator model, adding a trigger to the attack location, and generating a backdoor data set; and
   training the clean model by using the backdoor data set to obtain a dirty model.

2. The text classification backdoor attack prediction method according to claim 1, wherein the deleting any word $w_i$ of a text sequence x in a clean training sample $(x, y) \in D_C$ by using a positioning label generator, and inputting the clean training sample into the clean model to obtain a classification result $y_{\neg i}$ comprises:
   sequentially deleting/words in the text sequence $x=[w_1, w_2, w_3, w_1, \ldots, w_i, \ldots, w_l]$ in the clean training sample $(x, y) \in D_C$ by using the positioning label generator, and generating a candidate set $x_{\neg}=\{x_{\neg 1}, x_{\neg 2}, \ldots, x_{\neg i}, x_{\neg l}\}$ of the text sequence, wherein $x_{\neg i}=[w_1, w_2, w_3, w_1, \ldots, w_{i-1}, w_{i+1}, \ldots, w_l]$ is candidate set elements generated after an $i^{th}$ word $w_i$ in the text sequence x is deleted; and
   inputting the candidate set $x_{\neg}$ into the clean model for prediction, and outputting a classification label distribution logits $\varphi=[\varphi_1, \varphi_2, \varphi_3, \ldots, \varphi_i, \ldots, \varphi_l]$ of each word and a predicted label $y_{\neg}=\{y_{\neg 1}, y_{\neg 2}, \ldots, y_{\neg i}, y_{\neg l}\}$, wherein a calculation formula of the classification result $y_{\neg i}$, corresponding to $x_{\neg i}$ is as follows:

$$y_{\neg i} = \underset{v \in C}{\mathrm{argmax}}\, \mathrm{softmax}(\varphi_i)_{(v)},$$

wherein C is a label space size in a text classification task.

3. The text classification backdoor attack prediction method according to claim 2, wherein the comparing the classification result $y_{\neg i}$ with a source label y of the text sequence x, labeling the word $w_i$ according to a comparison result, and generating a pseudo label data set comprises:
   comparing the classification result $y_{\neg i}$ corresponding to $x_{\neg i}$ with the source label y by using an XOR operation, and performing labeling by using a pseudo locator label $\hat{y}$, wherein if $y_{\neg i} \neq y$, it represents that a sentence classification result is changed after the $i^{th}$ word $w_i$ in the text sequence x is deleted, and a location of the $i^{th}$ word in the text sequence x is the attack location, wherein a calculation formula of the pseudo locator label $\hat{y}$ is as follows:

$$\hat{y}_i = y \oplus y_{\neg i},$$

wherein $\hat{y}=[\hat{y}_1, \hat{y}_2, \hat{y}_3, \ldots, \hat{y}_l]$ represents a pseudo locator label of each word, $\hat{y}_i=1$ represents that the location of the $i^{th}$ word is a valid attack location, and $\hat{y}_i=0$ represents the opposite; and
   gathering all labeled data to form the pseudo label data set D P:

$$D_P = \{(x, \varphi, \hat{y}) | \hat{y}_i = y\hat{y}_i(x, y) \in D_C\}.$$

4. The text classification backdoor attack prediction method according to claim 3, wherein the performing multi-task training on a Sequence-to-Sequence model by using the pseudo label data set to obtain a locator model comprises:

making the Sequence-to-Sequence model comprise one Transformer Encoder component and two Transformer Decoder components;

making the multi-task training comprise a primary task and an auxiliary task, wherein the primary task trains a first Transformer Decoder component, the auxiliary task trains a second Transformer Decoder component, and the primary task and the auxiliary task train one Transformer Encoder component together;

inputting the text sequence in the pseudo label data set and a corresponding source mask into the Transformer Encoder component and the second Transformer Decoder component, generating a predicted classification label distribution φ' corresponding to the text sequence, and using prediction of the classification label distribution as training of the auxiliary task by using a loss function $L_{Dist}(\varphi, \varphi')$;

inputting the text sequence in the pseudo label data set and the source mask into the Transformer Encoder component and the first Transformer Decoder component, generating a predicted locator label corresponding to the text sequence, and using prediction of the locator label as training of the primary task by using a cross-entropy loss function $L_{CE}$; and completing training of the Sequence-to-Sequence model by using a minimum loss function $L_{total}$ to obtain the locator model, wherein the source mask is an additional input of the locator model, a meaningless single-character word set S is defined, and if the word $w_i$ in the text sequence $\in S$, a mask value $m_i$ corresponding to $w_i$ is 0, that is $m_i=0$, or otherwise $m_i=1$;

a calculation formula of $L_{Dist}(\varphi, \varphi')$ is as follows:

$$L_{Dist}(\varphi, \varphi') = \frac{1}{l}\sum_{i=1}^{l} L_{MSE}(\text{softmax}(\varphi_i), \text{softmax}(\varphi'_i)) = \frac{1}{l}\sum_{i=1}^{l}(\text{softmax}(\varphi_i) - \text{softmax}(\varphi'_i))^2,$$

and
a calculation formula of $L_{total}$ is as follows:

$$L_{total}=L_{CE}+\gamma \cdot L_{Dist},$$

wherein γ is a parameter for controlling a weight of the auxiliary task and MSE represents mean squared error.

5. The text classification backdoor attack prediction method according to claim 1, wherein the generating a backdoor data set by using the locator model comprises:

inputting a subset in the clean training set into the locator model, outputting a probability P of each attack location, selecting k words with the largest probability as a final attack location, and adding a trigger to the final attack location to obtain the backdoor data set.

6. The text classification backdoor attack prediction method according to claim 1, wherein the training the clean model by using the backdoor data set to obtain a dirty model comprises:

predicting a clean test set by using the locator model to obtain an attack location;

adding a trigger to the attack location to obtain a backdoor test text; and inputting the backdoor test text into the dirty model for prediction to obtain a backdoor trigger result.

7. A text classification backdoor attack prediction system, comprising:

a clean model training module, configured to train a pretraining model by using a clean training set $D_C$ to obtain a clean model;

a pseudo label data set generation module, configured to: delete any word $w_i$ of a text sequence x in a clean training sample $(x, y) \in D_C$ by using a positioning label generator, input the clean training sample into the clean model to obtain a classification result $y_{-i}$, compare the classification result $y_{-i}$ with a source label y of the text sequence x, label the word $w_i$ according to a comparison result, and generate a pseudo label data set;

a locator training module, configured to perform multi-task training on a Sequence-to-Sequence model by using the pseudo label data set to obtain a locator model;

a backdoor data set generation module, configured to: predict an attack location of the clean data set by using the locator model, add a trigger to the attack location, and generate a backdoor data set;

a dirty model generation module, configured to train the clean model by using the backdoor data set to obtain a dirty model; and a memory, configured to store the modules.

8. The text classification backdoor attack prediction system according to claim 7, further comprising:

a prediction module, configured to: predict a clean test set by using the locator model to obtain an attack location, add a trigger to the attack location to obtain a backdoor test text, and input the backdoor test text into the dirty model for prediction to obtain a backdoor trigger result.

9. A text classification backdoor attack prediction device, comprising:

a memory, configured to store a computer program; and
a processor, configured to implement, when executing the computer program, the steps of the text classification backdoor attack prediction method according to claim 1.

10. A non-transitory computer-readable storage medium, the non-transitory computer-readable storage medium storing a computer program, the computer program when executed by a processor to implement the steps of the text classification backdoor attack prediction method according to claim 1.

* * * * *